(12) United States Patent
Ikeda et al.

(10) Patent No.: US 10,641,933 B2
(45) Date of Patent: *May 5, 2020

(54) TRANSPARENT LIGHT SCATTERING BODY, REFLECTIVE TRANSPARENT SCREEN COMPRISING SAME, AND VIDEO IMAGE PROJECTION SYSTEM COMPRISING SAME

(71) Applicant: JXTG NIPPON OIL & ENERGY CORPORATION, Tokyo (JP)

(72) Inventors: Satoru Ikeda, Tokyo-to (JP); Kousuke Yamaki, Tokyo-to (JP); Akira Matsuo, Tokyo-to (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/096,192

(22) PCT Filed: Apr. 12, 2017

(86) PCT No.: PCT/JP2017/015035
§ 371 (c)(1),
(2) Date: Oct. 24, 2018

(87) PCT Pub. No.: WO2017/187990
PCT Pub. Date: Nov. 2, 2017

(65) Prior Publication Data
US 2019/0146127 A1    May 16, 2019

(30) Foreign Application Priority Data

Apr. 25, 2016   (JP) .................................. 2016-087322

(51) Int. Cl.
*G02B 5/02*    (2006.01)
*G03B 21/62*   (2014.01)
(Continued)

(52) U.S. Cl.
CPC ............ *G02B 5/0278* (2013.01); *B32B 27/14* (2013.01); *G02B 5/02* (2013.01); *G02B 5/0294* (2013.01);
(Continued)

(58) Field of Classification Search
CPC ...... G02B 5/0278; G02B 5/0294; G02B 5/02; B32B 27/14; B32B 2307/412;
(Continued)

(56) References Cited

U.S. PATENT DOCUMENTS

| | | |
|---|---|---|
| 2011/0002035 A1 | 1/2011 | Okamoto |
| 2014/0185282 A1 | 7/2014 | Hsu et al. |
| 2017/0059982 A1 | 3/2017 | Watanabe et al. |

FOREIGN PATENT DOCUMENTS

| | | |
|---|---|---|
| CN | 1514951 | 7/2004 |
| JP | 3-119334 | 5/1991 |

(Continued)

OTHER PUBLICATIONS

International Search Report dated Jul. 18, 2017 in corresponding International Application No. PCT/JP2017/015035.

(Continued)

*Primary Examiner* — George G King
(74) *Attorney, Agent, or Firm* — Wenderoth, Lind & Ponack, L.L.P.

(57) ABSTRACT

A transparent light scattering body according to the present invention is characterized in that it comprises a transparent binder and metallic microparticles, wherein the regular reflectance R of the metallic material of the metallic microparticles is 50% or more in the measured wave length of 550 nm, and the absolute value of the difference between the regular reflectance R in the measured wave length of 450 nm and the regular reflectance R in the measured wave length of 650 nm is within 25% of the regular reflectance R in the measured wave length of 550 nm, and the average particle size of the secondary particles of the metallic microparticles in the transparent light scattering body is from 100 nm to 2000 nm.

21 Claims, 1 Drawing Sheet

(51) Int. Cl.
*G03B 21/14* (2006.01)
*B32B 27/14* (2006.01)
*G03B 21/60* (2014.01)
*C09D 125/06* (2006.01)

(52) U.S. Cl.
CPC .......... *G03B 21/14* (2013.01); *G03B 21/142* (2013.01); *G03B 21/60* (2013.01); *G03B 21/62* (2013.01); *B32B 2307/412* (2013.01); *C09D 125/06* (2013.01)

(58) Field of Classification Search
CPC ...... G03B 21/142; G03B 21/62; G03B 21/14; G03B 21/60; C09D 125/06
See application file for complete search history.

(56) References Cited

FOREIGN PATENT DOCUMENTS

| | | |
|---|---|---|
| JP | 10-186521 | 7/1998 |
| JP | 2004-54132 | 2/2004 |
| JP | 2007-041556 | 2/2007 |
| JP | 2011-237628 | 11/2011 |
| JP | 5752834 * | 7/2015 ............. G03B 21/62 |
| JP | 2016-509685 | 3/2016 |
| KR | 10-2004-0065207 | 7/2004 |
| KR | 10-2005-0043420 | 5/2005 |
| WO | 2015/159829 | 10/2015 |
| WO | 2016/203915 | 12/2016 |

OTHER PUBLICATIONS

International Preliminary Report on Patentability dated Nov. 8, 2018 in corresponding International Application No. PCT/JP2017/015035.
Notification of Reason for Refusal dated Feb. 27, 2019 in Korean Patent Application No. 10-2018-7030867, with English-language translation.
Office Action dated Jul. 2, 2019 in corresponding Chinese Patent Application No. 201780023633.6, with Machine translation.
Extended European Search Report dated Nov. 21, 2019 in EP Patent Application No. 17789277.5.

* cited by examiner

US 10,641,933 B2

TRANSPARENT LIGHT SCATTERING BODY, REFLECTIVE TRANSPARENT SCREEN COMPRISING SAME, AND VIDEO IMAGE PROJECTION SYSTEM COMPRISING SAME

TECHNICAL FIELD

The present invention relates to a transparent light scattering body having excellent transparency and color reproducibility and high brilliance and which can provide a reflective transparent screen that enables clear vision of an image, a reflective transparent screen comprising thereof, and a video image projection system comprising the same.

BACKGROUND ART

Conventionally, a combination of a Fresnel lens sheet and a lenticular lens sheet has been used for a projector screen. In recent years, there is a growing a demand for displaying merchandise information, advertisement, or the like by projection on a show window of a department store or the like, a transparent partition of an event venue, or the like while maintaining the transparency thereof. It is said that, in the future, there will be a further increasing demand for a transparent screen which is used for a head-up display, a wearable display, or the like.

However, since a conventional projector screen is low in transparency, there is a technical problem that such a projector screen cannot be applied to a transparent partition, or the like. Accordingly, various screens are proposed which can provide high transparency. For example, there is proposed a reflective screen characterized in printing or coating ink which is a filler made by mixing 7 parts by weight of aluminum flakes and 25 parts by weight of pearl pigment flakes made by coating titanium dioxide on mica as the matrix, onto a plastic film or sheet to produce a light reflective layer (see Patent Document 1). Also proposed is a reflective screen for a projector, characterized in that a light scattering layer is set on the substrate, which comprises 10 to 80 by weight of non-filling type flake-form aluminum paste as a light reflective agent based on 100 parts by weight of a binder resin, and further 50% by weight or more of a light diffusing agent based on the light diffusing agent (see Patent Document 2). Further, there is proposed a reflective screen formed by layering a light diffusion layer which is formed of a continuous layer constituted of a transparent resin and a dispersion layer consisted of anisotropic transparent particles on to a light reflective substrate (see Patent Document 3).

RELATED ART DOCUMENTS

Patent Documents

Patent Document 1 Japanese Unexamined Patent Application Publication No. 1991-119334
Patent Document 2 Japanese Unexamined Patent Application Publication No. 1998-186521
Patent Document 3 Japanese Unexamined Patent Application Publication No. 2004-54132

SUMMARY OF THE INVENTION

Problems to be Solved by the Invention

However, the present inventors found the following technical problems in Patent Documents 1 to 3. The reflective screen as described in Patent Document 1 does not allow a clear vision of an image due to the glare of the coating film since flake particles having an average particle size from 5 μm to 200 μm are coated onto the surface of the base material in high concentration, and further, it is not possible to see through since a white vinyl chloride film is used on the base material, which results in a technical problem that it is not suitable for use as a transparent screen. The reflective screen as described in Patent Document 2 comprises 10 to 80 by weight of flake-form aluminum having an average particle size from 4 μm to 60 μm as a light reflective agent in high concentration, and the obtained film cannot be seen through, which results in a technical problem that it is not suitable for use as a transparent screen. The reflective screen as described in Patent Document 3 has a low regular reflectance since anisotropic transparent particles dispersed in the dispersion layer are non metallic particles of mica, talc, and montmorillonite, and particularly, talc and montmorillonite are clay based particles, which results in a technical problem that it is not suitable for use as a transparent screen.

Means for Solving the Problems

The present invention has been made in view of the above-described technical problems, and an object of the present invention is to provide a transparent light scattering body having excellent transparency and color reproducibility and high brilliance and which can provide a reflective transparent screen that enables clear vision of an image. It is also an object of the present invention to provide a transparent screen comprising the transparent light scattering body and to provide a video image projection system comprising the transparent light scattering body or the transparent screen and a video image projector.

In order to solve the above described technical problems, the present inventors intensively studied to find that the above described technical problems can be solved by dispersing particular metallic microparticles in a transparent binder to form a transparent light scattering body, and that a transparent light scattering body can be suitable for use as a reflective transparent screen. The present invention has been completed based on such findings.

That is, according to one aspect of the present invention, provided is a transparent light scattering body comprising a transparent binder and metallic microparticles, wherein the regular reflectance R of the metallic material of the metallic microparticles is 50% or more in the measured wave length of 550 nm, and the absolute value of the difference between the regular reflectance R in the measured wave length of 450 nm and the regular reflectance R in the measured wave length of 650 nm is within 25% of the regular reflectance R in the measured wave length of 550 nm, and the average particle size of the secondary particles of the metallic microparticles in the transparent light scattering body is from 100 nm to 2000 nm.

In one aspect of the present invention, the content of the metallic microparticles is preferably from 0.0001 to 0.020% by mass based on the transparent binder.

In one aspect of the present invention, preferably, real number term ε' of electric permittivity in the wave length 550 nm of the metallic microparticles is from −60 to 0.

In one aspect of the present invention, preferably, the metallic material is at least one selected from the group consisting of aluminum, silver, platinum, titanium, nickel, and chromium.

In one an aspect of the present invention, preferably, the haze value of the transparent light scattering body is 35% or less.

In one aspect of the present invention, preferably, total light transmittance of the transparent light scattering body is 70% or more.

In one aspect of the present invention, preferably, image clarity of the transparent light scattering body is 70% or more.

In one aspect of the present invention, preferably, the transparent light scattering body is for the reflective transparent screen.

According to another aspect of the present invention, a reflective transparent screen comprising the above-described transparent light scattering body is provided.

In one aspect of the present invention, the reflective transparent screen has a relative brilliance of diffuse reflectance light measured by a goniophotometer, preferably satisfying the following condition A:

Condition A: relative brilliance of diffuse reflectance light at 90 degrees is 0.001 or more, when light was introduced in a 45 degrees angle against the parallel direction of the screen surface of the reflective transparent screen and when brilliance in the specular reflection direction of 135 degrees was determined as 100.

According to another aspect of the present invention, provided is a member for a vehicle comprising the transparent light scattering body or the reflective transparent screen described above.

According to another aspect of the present invention, provided is a member for a building comprising the transparent light scattering body or the reflective transparent screen described above.

According to another aspect of the present invention, provided is a video image projection system comprising the above-described transparent light scattering body or the above-described reflective transparent screen and a video image projector.

Effects of the Invention

The transparent light scattering body according to the present invention has excellent transparency and color reproducibility and high brilliance and can provide a reflective transparent screen that enables clear vision of an image. Further, the transparent light scattering body according to the present invention can be suitable for use as a member for a vehicle or a building. The transparent light scattering body according to the present invention can also be suitable for use as a light guide plate used for a light source in an image display, an image projector, a scanner, and the like.

MODE FOR CARRYING OUT THE INVENTION

<Transparent Light Scattering Body>

The transparent light scattering body according to the present invention comprises a transparent binder and metallic microparticles. In the transparent light scattering body, the metallic microparticles dispersed in the transparent binder can aggrolomerate in an appropriate size, and projection light emitted from a video image projector can be anisotropically scattered and reflected such that an image is formed. When the transparent light scattering body according to the present invention is used as the reflective transparent screen, it is possible to attain excellent transparency and color reproducibility, high brilliance, and a clear vision of an image. Such transparent light scattering body can be suitable for use as a reflective transparent screen which are used for a head-up display, a wearable display, or the like. In the present invention, the term "transparent" means transparent in the degree that transmission visibility depending on the applications can be attained and also includes being "translucent".

Figure 1:
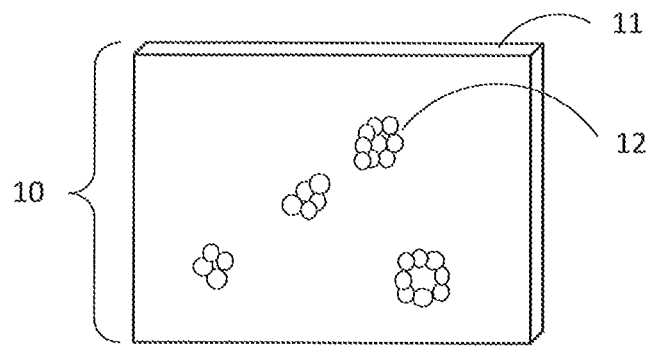
FIG. 1 is a cross-sectional view in the thickness direction of one embodiment of the transparent light scattering body according to the present invention.

A cross-sectional view in the thickness direction of one embodiment of the transparent light scattering body according to the present invention is shown in FIG. 1. Transparent light scattering body 10 is formed by transparent binder 11 in which metallic microparticles 12 are dispersed. Such transparent light scattering body may be a laminate of a multilayer constitution comprising other layers such as a protection layer, a backing layer, an adhesive layer, and an antiglare layer.

The haze value of the transparent light scattering body is preferably 35% or less, more preferably from 1 to 25%, more preferably from 1.5 to 20%, even more preferably from 2 to 15%, and particularly preferably from 2.5 to 10%. The total light transmittance is preferably 70% or more, more preferably 75% or more, further preferably 80% or more, even more preferably 85% or more, still preferably 99% or less, more preferably 97% or less, further preferably 95% or less, and even more preferably 90% or less. The color can be evaluated with the value of a* and b* in CIE 1976 color space (L*, a*, b*). The color of the scattered light when white light was introduced in terms of both a* and b* is preferably from −20 to +20, more preferably from −10 to +10, and further preferably from −5 to +5. When the haze value and the total light transmittance are within the above-described ranges, the color reproducibility and performance as a screen become excellent. In the present invention, the haze value and the total light transmittance of the transparent light scattering body can be measured in accordance with JIS-K-7361 and JIS-K-7136 by using a turbidimeter (manufactured by NIPPON DENSHOKU INDUSTRIES CO., LTD., product number: NDH-5000). The color of the transparent light scattering body can be evaluated from the values of a* and b* as expressed by the CIE1976 color space of the reflective light in the 0 degree direction when the entry angle was set to 45 degrees by using a goniophotometer (manufactured by NIPPON DENSHOKU INDUSTRIES CO., LTD., part number: GC5000L, light source D65).building The image clarity of the transparent light scattering body is preferably 70% or more, more preferably 75% or more, further preferably 80% or more, even more preferably 85% or more, particularly preferably 90% or more, still preferably 99% or less, more preferably 98% or less, further preferably 97% or less, and even more preferably 95% or less. When the image clarity of the transparent light scattering body is within the above-described ranges, the image seen through the transparent screen becomes extremely clear. In the present invention, the image clarity is the value of the image definition (%) as measured with an optical comb width of 0.125 mm in accordance with JIS K7374.

Thickness of the transparent light scattering body is, without particular limitation, preferably from 0.1 μm to 20 mm, more preferably from 0.5 μm to 1.5 mm, further preferably from 1 µm to 10 mm, in view of application, productivity, handling, and transportation. In the present invention, "a transparent light scattering body" encompasses molded bodies having various thickness such as the so-called coated film body or plate (a plate-like molded article) formed by coating on a film, sheet, and a substrate.

(Transparent Binder)

In the present invention, a transparent binder is used to obtain a highly transparent light scattering body. The transparent binder includes organic and inorganic binders. As for the organic binder, self-crosslinkable resins such as a thermoplastic resin, a thermoset resin, and an ionizing radiation-curable resin can be used.

The thermoplastic resin includes an acrylic resin, a polyester resin, a polyolefin resin, a cellulose resin, a vinyl resin, a polycarbonate resin, a polystyrene resin, a polyamide resin, a fluorine resin, a polyimide resin, and the like. Amongst these, it is more preferable to use a methyl polymethacrylate resin, a polyethylene terephthalate resin, a polyethylene naphthalate resin, a polypropylene resin, a cycloolefin polymer resin, a cellulose acetate propionate resin, a polyvinyl butyral resin, a polycarbonate resin, a nitrocellulose resin, and a polystyrene resin. One of these resins may be used alone or two or more may be used in a combination.

The ionizing radiation-curable resin includes an acrylic resin, a urethane resin, an acrylic urethane resin, an epoxy resin, a silicone resin, and the like. Among these, those having an acrylate functional group, for example, those containing a relatively large amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight are preferable. The ionizing radiation-curable resin may also be obtained by mixing a thermoplastic resin and a solvent.

The thermoset resin includes a phenolic resin, an epoxy resin, a silicone resin, a melamine resin, a urethane resin, a urea resin, and the like. Amongst these, an epoxy resin and a silicone resin are preferable.

The highly transparent inorganic binder includes, for example, liquid glass, a glass material having a low softening point, or a sol-gel material. Liquid glass is a solution rich in alkali silicate and normally sodium is contained as an alkali metal. A representative liquid glass can be expressed by $Na_2O \cdot nSiO_2$ (n: a given number of a positive value) and commercially available liquid glass includes sodium silicate solution manufactured by Fuji Kagaku Corp. can be used.

The glass material having a low softening point is glass having a softening temperature preferably in the range from 150 to 620° C., more preferably from 200 to 600° C., most preferably from 250 to 550° C. Such glass materials include a lead-free low softening point glass, or the like, obtainable by thermal treatment of a mixture comprising $PbO$—$B_2O_3$ based, $PbO$—$B_2O_3$—$SiO_2$ based, $PbO$—$ZnO$—$B_2O_3$ based acid component and metallic chloride. In order to improve the dispersibility and formability of the microparticles, solvents and organic solvents having a high boiling point can be mixed to the low softening point glass material.

Sol-gel materials are a group of compounds which hydrolytic polycondensation proceeds and the material cures by action of heat, light, catalysts, or the like. For example, they may be metal alkoxide (metal alcoholate), a metal chelate compound, halogenated metal, fluid glass, a spin-on glass, or reactants thereof and catalysts may be included therein to accelerate curing. Those having photoreactive functional groups such as an acrylic group in a moiety of a metal alkoxide functional group may be also possible. These may be used alone or in combination of multiple kinds, depending on the required physicalities. A curing body of the sol-gel material refers to a state where the polymerization reaction of the sol-gel material has been sufficiently progressed. The sol-gel material chemically bonds and strongly adheres to the surface of an inorganic substrate in the course of polymerization reaction. Accordingly, by using the curing body of the sol-gel material as a cured layer, a stable cured layer can be formed.

Metal alkoxides are a group of compounds obtainable from a reaction of any metallic species with water or organic solvents by hydrolysis catalysts, and are a group of compounds which any metallic species and functional groups such as a hydroxyl group, a methoxy group, an ethoxy group, a propyl group, an isopropyl group, or the like, are bonded. Metallic species of a metal alkoxide include silicon, titanium, aluminum, germanium, boron, zirconium, tungsten, sodium, potassium, lithium, magnesium, tin, or the like.

A metal alkoxide in which the metallic species is silicon includes, for example, dimethyldiethoxysilane, diphenyldiethoxysilane, phenyltriethoxysilane, methyltriethoxysilane (MTES), vinyltriethoxysilane, p-styryltriethoxysilane, methylphenyldiethoxysilane, 2-(3,4-epoxycyclohexyl)ethyltriethoxysilane, 3-glycidoxypropyltriethoxysilane, 3-glycidoxypropylmethyldiethoxysilane, 3-methacryloxypropylmethyldiethoxysilane, 3-methacryloxypropyltriethoxysilane, 3-acryloxypropyltriethoxysilane, N-2-(aminoethyl)-3-aminopropylmethyldiethoxysilane, N-2-(aminoethyl)-3-aminopropyltriethoxysilane, 3-aminopropyltriethoxysilane, 3-ureidopropyltriethoxysilane, 3-mercaptopropylmethyldiethoxysilane, 3-mercaptopropyltriethoxysilane, triethoxysilane, diphenylsilanediol, dimethylsilanediol, or a group of compounds in which the ethoxy group of these group of compounds are substituted with a methoxy group, a propyl group, an isopropyl group, a hydroxyl group, or the like. Amongst these, especially preferred are triethoxysilane (TEOS) and tetramethoxysilane (TMOS) in which the ethoxy group of TEOS is substituted by a methoxy group. These may be used alone or in a combination of multiple kinds.

(Solvent)

These organic and inorganic binders may further comprise a solvent, if necessary. The solvent is not limited to organic solvents and solvents used in general coating compositions can be used. For example, a hydrophilic solvate, represented by water, can also be used. When the binder of the present invention is a liquid, the solvent need not be contained.

Specific examples of the solvent include, for example, alcohols such as methanol, ethonaol, isopropyl alcohol (IPA), n-propanol, butanol, 2-butanol, ethylene glycol, and propylene glycol; aliphatic carbon hydrides such as hexane, heptane, octane, decane, and cyclohexane; aromatic carbon hydrides such as benzene, toluene, xylene, mesitylene, and tetramethylbenzene; ethers such as diethylether, tetrahydrofuran, and dioxane; ketones such as acetone, methyl ethyl ketone, isophorone, cyclohexanone, cyclopentanone, and N-methyl-2-pyrrolidone; ether alcohols such as butoxyethyl ether, hexyloxy ethyl alcohol, methoxy-2-propanol, and benzyloxy ethanol; glycols such as ethylene glycol and propylene glycol; glycol ethers such as ethylene glycol dimethylether, diethylene glycol dimethyl ether, propylene glycol monomethyl ether acetate, cellosolve, methyl cellosolve, ethyl cellosolve, carbitol, methyl carbitol, ethyl carbitol, butyl carbitol, propylene glycol monomethyl ether, propylene glycol monoethyl ether, dipropylene glycol monomethyl ether, dipropylene glycol monoethyl ether, triethylene glycol monomethyl ether, and triethylene glycol monoethyl ether; esters such as ethyl acetate, butyl acetate, ethyl lactate, and γ-butylolactone; phenols such as phenol and chlorophenol; amides such as N,N-dimethyl formamide, N,N-dimethyl acetamide, and N-methylpyrrolidone; halogenated solvates such as chloroform, methylene chloride, tetrachloroethane, monochlorobenzene, and dichlorobenzene; hetero element containing compounds such as carbon bisulfide; water; and mixed solvates thereof. The amount of solvates to be added can be appropriately adjusted, depending on, for example, the kind of binders or microparticles, or the viscosity range suitable for the manufacturing steps to be discussed below.

(Metallic Microparticles)

Employed as the metal materials for use in the metallic microparticles are metals excellent in the reflectivity and the color reproducibility of projection light. In particular, the metal material has a reflectivity R in the measured wave length of 550 nm, of 50% or more, preferably 55% or more, further preferably 60% or more, and further more preferably 70% or more, and preferably 99% or less, more preferably 98% or less, further preferably 97% or less, and further more preferably 95% or less. In the following, "reflectivity R" as used herein, refers to the reflectivity when light was introduced from the perpendicular direction against the metal material. Reflectivity R can be calculated from the following formula (1), using values of refractive index n and extinction value k which are characteristic values of the metal material. n and k are described in, for example, Handbook of Optical Constants of Solids: Volume 1 (authored by Edward D. Palik) and P. B. Johnson and R. W Christy, *PHYSICAL REVIEW B*, Vol. 6, No. 12, 4370-4379 (1972).

$$R=\{(1-n)^2+k^2\}/\{(1+n)^2+k^2\} \quad \text{formula (1)}$$

That is to say, reflectivity R (550) in the measured wavelength of 550 nm can be calculated from n and k measured at wavelength 550 nm. The metal material has an absolute value of difference between reflectivity R (450) in the measured wavelength 450 nm and reflectivity R (650) in the measured wavelength 650 nm within 25%, preferably within 20%, more preferably within 15%, further preferably within 10%, and preferably 0% or more, more preferably 0.5% or more, and further more preferably 1% or more, based on reflectivity R (650) in the measured wavelength 550 nm. The use of such reflective transparent screen using such metal material will provide excellent reflectivity and color reproducibility of projection light and excellent performance as a screen.

The metal material used for the metallic microparticles have a real number term ε' (550) of electric permittivity at 550 nm preferably from −60 to 0, more preferably from −50 to −5, further preferably from −47 to −8, and further more preferably from −45 to −10. The real number term ε' of the electric permittivity can be calculated from the following formula (2) using values of the refractive index n and the extinction index k.

$$\varepsilon'=n^2-k^2 \quad \text{formula (2)}$$

Although the present invention is not restricted by any theory, the real number term ε' of the electric permittivity for the metal material satisfying the above numerical range will generate the following action, whereby a suitable use of the transparent light scattering body as the reflective type transparent screen can be possibly attained. That is to say, when light enters into the metallic microparticles, an oscillating electric field is generated by light in the metallic microparticles; however, at the same time, a reversed electrical polarization is generated by free electrons, blocking the electric field. On the assumption of an ideal state where there is no dispersion by the concavoconvex surface and no light absorbance by the metallic microparticles, when the real number term ε' of the electric permittivity of the metallic material is 0 or less, light is completely blocked and light cannot enter into the metallic microparticles, i.e., all light is reflected at the surface of the metallic microparticles, and therefore, the reflectivity of light becomes strong. When ε' is 0 or higher, oscillation of the free electrons of the metallic microparticles cannot follow the oscillation of light, thus, the oscillating electric field by light cannot be completely denied and light will enter into or transmit through the metallic microparticles. As a result, only a portion of light is reflected at the surface of the metallic microparticles and the reflectivity of light will become low. Also, since oxides and the like have few free electrons which are capable of contributing to oscillation, the reflectivity of light is low.

Those satisfying the above-described reflectivity R and preferably also the real number term of the electric permittivity may be used as the metal materials, and pure metal or alloy may also be used. Pure metal is preferably selected from the group consisting of aluminum, silver, platinum, titanium, nickel, and chromium. As for various metallic microparticles, use may be made to microparticles consisted of those metallic materials and microparticles made by coating a resin, glass, natural mica or synthetic mica, and the like to those metallic materials. The refractive index n and the extinction index k in each measured wavelength for various metal materials are summarized in Table 1 and those values were used to calculate the reflectivity R and ε', which are summarized in Table 2. Now n (450) represents a refractive index at the measured wave length of 450 nm, n (550) represents a refractive index at the measured wave length of 550 nm, and n (650) represents a refractive index at the measured wave length of 650 nm. In addition, k (450) represents an extinction index at the measured wave length of 450 nm, k (550) represents an extinction index at the measured wave length of 550 nm, and k (650) represents an extinction index at the measured wave length of 650 nm.

TABLE 1

| metal materials | refractive index n | | | extinction index k | | |
| --- | --- | --- | --- | --- | --- | --- |
| | n(450) | n(550) | n(650) | k(450) | k(550) | k(650) |
| aluminum | 0.62 | 0.96 | 1.49 | 5.48 | 6.70 | 7.82 |
| silver | 0.15 | 0.12 | 0.14 | 2.48 | 3.35 | 4.15 |
| platinum | 1.85 | 2.13 | 2.38 | 3.15 | 3.72 | 4.25 |
| titanium | 1.70 | 1.89 | 2.22 | 2.27 | 2.62 | 2.99 |
| nickel | 1.64 | 1.77 | 2.02 | 2.66 | 3.26 | 3.82 |
| chromium | 2.34 | 3.17 | 3.10 | 3.14 | 3.33 | 3.33 |
| titanium oxide | 3.14 | 2.95 | 2.86 | 0 | 0 | 0 |

TABLE 1-continued

| metal materials | refractive index n | | | extinction index k | | |
|---|---|---|---|---|---|---|
| | n(450) | n(550) | n(650) | k(450) | k(550) | k(650) |
| copper | 1.17 | 0.95 | 0.21 | 2.40 | 2.58 | 3.67 |
| gold | 1.50 | 0.35 | 0.17 | 1.88 | 2.73 | 3.15 |

TABLE 2

| metal materials | reflectivity R [%] | | | \|R(450) − R(650)\|/ R(550) × 100 [%] | real number term ε' of electric permittivity | | |
|---|---|---|---|---|---|---|---|
| | R(450) | R(550) | R(650) | | ε' (450) | ε' (550) | ε' (650) |
| aluminum | 92 | 92 | 91 | 1.1 | −29.65 | −43.96 | −58.93 |
| silver | 92 | 96 | 97 | 5.2 | −6.12 | −11.19 | −17.20 |
| platinum | 59 | 64 | 68 | 14.1 | −6.54 | −9.31 | −12.41 |
| titanium | 45 | 50 | 54 | 18.0 | −2.28 | −3.27 | −4.01 |
| nickel | 53 | 61 | 66 | 21.3 | −4.40 | −7.47 | −10.51 |
| chromium | 55 | 55 | 56 | 1.8 | −4.41 | −1.04 | −1.48 |
| titanium oxide | 27 | 24 | 23 | 16.7 | 9.86 | 8.73 | 8.18 |
| copper | 55 | 64 | 94 | 60.9 | −4.39 | −5.74 | −13.42 |
| gold | 39 | 85 | 94 | 64.7 | −1.26 | −7.34 | −9.89 |

The metallic microparticles are agglomerated in an appropriate size which satisfies both the transparency and reflectivity in the transparent light scattering body. In particular, the average particle size of the secondary particles in the transparent light scattering body is from 100 nm to 2000 nm, preferably from 200 nm to 1800 nm, and more preferably from 300 nm to 1500 nm. When the average particle size of the secondary particles is too small, Rayleigh scattering occurs to reflect blue light, whereby the video image light to be visualized will have a bluish color. Also when the average particle size of the secondary particles is too small, a large amount of microparticles will need to be added to project the emitted projection light from the projector, resulting in a light scattering body with poor transparency. When the average particle size of the secondary particles is 100 nm or more, it is possible to prevent the video image light to be visualized from turning bluish. However, when the average particle size of the secondary particles is too large, forward scattering of the projected light increases to elevate the haze value, whereby transparency of the light scattering body is reduced. When the average particle size of the secondary particles is 2000 nm or less, it is possible to attain an exceptionally outstanding transparency. The average particle size of the secondary particles is the value obtained by calculating the average of the particle size when the particle size=(particle size in the long axis direction+particle size in the short axis direction)/2, based on the image measured with a scanning electron microscope (SEM, manufactured by Hitachi High-Technologies Corporation, product name: SU-1500).

The content of the metallic microparticles in the transparent light scattering body is preferably from 0.0001 to 0.020% by mass, more preferably from 0.0005 to 0.015% by mass, and further preferably from 0.001 to 0.01% by mass, based on the binder. When the content of the metallic microparticles are 0.0001% or more, the projection light can be projected more clearly and when the content is 0.020% by mass or less, reduction of the film transparency can be sufficiently suppressed. When the metallic microparticles are dispersed in the resin in an extremely low concentration as like the above ranges to form the transparent light scattering body, the projection light can be anisotropically diffused and reflected for image formation while maintaining the transparency.

(Backing Layer)

A backing layer is a layer for supporting the transparent light scattering body, which can improve the strength of the transparent light scattering body. The backing layer is preferably formed by using a highly transparent resin or glass, which does not compromise the transmission visibility or the desired optical property of the transparent light scattering body. For such a resin, a resin having similar high transparency with the light scattering body described above can be used. That is to say, thermoplastic resins, thermoset resins and ionizing radiation-curable resins such as an acrylic resin, an acrylic urethane resin, a polyester acrylate resin, a polyurethane acrylate resin, an epoxy acrylate resin, a polyester resin, a polyolefin resin, a urethane resin, an epoxy resin, a polycarbonate resin, a cellulose resin, an acetal resin, a vinyl resin, a polystyrene resin, a polyamide resin, a polyimide resin, a melamine resin, a pheloic resin, a silicaone resin, a polyarylate resin, a polyvinyl alcohol resin, a polyvinyl chloride resin, a polysulfone resin, and a fluorine resin can be suitably used. Also, a laminate or a sheet formed by layering 2 or more of the above-described resins can be used. The thickness of the backing layer can be appropriately changed depending on the application and/or material so that the strength thereof will be suitable. The thickness may be, for example, in the range of from 10 μm to 1 mm (1000 μm) and may be a thick board of 1 mm or more.

(Protection Layer)

A protection layer may be layered on both or the either one of the front side (observer side) and the back side of the transparent screen, and is a layer for imparting functions such as light resistance, scratch resistance, substrate adhesiveness, and stain resistance. The protection layer is preferably formed by using a resin which does not compromise the transmission visibility or the desired optical property of the transparent light scattering body. Examples of the material of the protection layer include, polyester resins such as polyethylene terephthalate and polyethylene naphtalate; cellulose reins such as diacetyl cellulose and triacetyl cellulose; acrylic resins such as polymethyl methacrylate; styrene resins such as polystyrene and acrylonitrile-styrene copolymer (AS resin); polycarbonate resins, and the like. Examples of the resin that forms the protection layer include, polyolefin resins as like polyethylene, polypropylene, ethylene-propylene copolymer; cycloolefin resins or olefin resins having a norbornene structure; vinyl chloride resins; amide resins such as nylon and aromatic polyamide; imide resins; sulfone resins; polyether sulfone resins; polyether ether ketone resins; polyphenylene sulfide resins; vinyl alcohol resins; vinylidene chloride resins; vinyl butyral resins; arylate resins; polyoxymethylene resins; epoxy resins; or blends of said resins. Others include, ionizing radiation-curable resins such as acrylic, urethane, acrylic urethane, epoxy, and silicone resins, those formed by mixing a thermoplastic resin and a solvent to an ionizing radiation-curable resin, and a thermoset resin, and the like.

For a film forming component of the ionizing radiation-curable resin composition, preferably, those having an acrylate functional group, for example, those containing a relatively large amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadlene resin, a polythiol polyene resin, a (meth)acrylate of a polyfunctional compound such as a polyalcohol and a reactivity diluent having a relatively low molecular weight can be used.

In order to make the above-described ionizing radiation-curable resin composition an ultraviolet light curable resin composition, acetophenones, benzophenons, Michler's benzoyl benzoates, α-amidoxime esters, tetramethyl thiuram monosulfides, and thioxanthones as photopolymerization initiators, and n-butyl amine, triethylamine, and poly-n-butylphosphine as photosensitizers may be added thereto to be used. In particular, in the present invention, a urethane acrylate as an oligomer and a dipentaerythritol hexa(meth)acrylate or the like as a monomer are preferably mixed.

An ionizing radiation-curable resin composition can be cured by normal curing methods, i.e., by irradiation of electron beams or ultraviolet light. For example, in the case of electron beam curing, electron beams having energy of 50 to 1000 KeV, and preferably 100 to 300 KeV released from a variety of electron beam accelerators such as Cockcroft-Walton-type, Van de Graaff-type, resonance transformer-type, insulating core transformer-type, linear-type, Dyna-mitron-type, and high-frequency-type is used, and in the case of ultraviolet light curing, ultraviolet light emitted from light beams such as an ultra-high pressure mercury lamp, a high pressure mercury lamp, a low pressure mercury lamp, a carbon arc, a xenon arc, and a metal halide lamp or the like can be used.

A protection layer can be formed by applying a coating of the above-described ionizing radiation (ultraviolet light)-curable resin composition on both or the either one of the front side (observer side) and the back side of the transparent light scattering body for a reflective transparent screen as described above by a method such as spin coating, die coating, dip coating, bar coating, flow coating, roll coating, or gravure coating, and by curing the coating by the above-described means. To the surface of the protection layer, a microstructure such as a concavoconvex structure, a prism structure, or a microlens structure can also be provided depending on the purposes.

(Adhesive Layer)

An adhesive layer is a layer for sticking the transparent light scattering body to the support. The adhesive layer is preferably formed by using an adhesive composition which does not compromise the transmission visibility or the desired optical property of the transparent light scattering body. Examples of the adhesive composition include a natural rubber, a synthetic rubber, an acryl resin, a polyvinyl ether resin, a urethane resin, a silicone resin and the like. Specific examples of the synthetic rubber include a styrene-butadiene rubber, an acrylonitrile-butadiene rubber, a polyisobutylene rubber, an isobutylene-isoprene rubber, a styrene-isoprene block copolymer, a styrene-butadiene block copolymer, and a styrene-ethylene-butylene block copolymer. Specific examples of the silicone resin include dimethyl polysiloxane. One of these adhesives can be used alone or two or more may be used in combination. Among these, an acrylic adhesive is preferred.

The acrylic resin adhesive at least includes an alkyl ester (meth)acrylate monomer and is formed by polymerization. Generally it is a copolymer of an alkyl ester (meth)acrylate monomer having an alkyl group having 1 to about 18 carbon atoms and a monomer having a carboxyl group. (Meth)acrylic acid means acrylic acid and/or methacrylic acid. Examples of the alkyl ester (meth)acrylate monomer include methyl (meth)acrylate, ethyl (meth)acrylate, n-propyl (meth)acrylate, sec-propyl (meth)acrylate, n-butyl (meth)acrylate, sec-butyl (meth)acrylate, tert-butyl (meth)acrylate, isoamyl (meth)acrylate, n-hexyl (meth)acrylate, cyclohexyl (meth)acrylate, n-octyl (meth)acrylate, isooctyl (meth)acrylate, 2-ethylhexyl (meth)acrylate, undecyl (meth)acrylate, and lauryl (meth)acrylate. Also, the above-described alkyl ester (meth)acrylate is usually copolymerized at a ratio of 30 to 99.5 parts by mass in the acrylic adhesive.

Monomers which have a carboxyl group which forms an acrylic resin adhesive include, monomers containing carboxyl groups of (meth) acrylic acid, itaconic acid, crotonic acid, maleic acid, monobutyl maleate, β-carboxyethyl acrylate, and the like.

Apart from the above-descriptions, monomers having other functional groups may be copolymerized to the acrylic resin adhesive, to the extent that the property of the acrylic resin adhesive is not compromised. Examples of the monomers having other functional groups include, monomers containing hydroxyl groups such as 2-hydroxyethyl (meth)acrylate, 2-hydroxypropyl (meth)acrylate, and aryl alcohol; monomers containing amide groups such as (meth)acrylamide, N-methyl(meth)acrylamide, and N-ethyl(meth)acrylamide; monomers containing amide groups and methylol groups such as N-methylol(meth)acrylamide and di methylol(meth)acrylamide; monomers having functional groups such as monomers containing amino groups such as aminomethyl(meth)acrylate, dimethyl aminoethyl(meth)acrylate, and vinylpyridine; and monomers containing epoxy groups such as aminoglycidyl ether and glycidyl ether (meth)acrylate. Also, other than these, fluorine-substituted alkyl ester (meth)acrylate, (meth)acrylonitrile, as well as vinyl group containing aromatic compounds such as styrene and methyl styrene, vinyl acetate, and halogenated vinyl compounds may be included.

A commercially available adhesive may be used, and examples thereof include SK-Dyne 2094, SK-Dyne 2147, SK-Dyne 1811L, SK-Dyne 1442, SK-Dyne 1435, and SK-Dyne 1415 (manufactured by Soken Chemical & Engineering Co., Ltd.), Oribain EG-655, and Oribain BPS5896 (manufactured by TOYO INK CO., LTD.) or the like (trade name), which can be suitably used.

(Reflection Protection Layer)

A reflection protection layer is a layer for preventing a reflection or a reflection of external light on the surface of the transparent light scattering body or the outermost surface of a laminate in the case where the transparent light scattering body is a laminate with a support and the like. The reflection protection layer may be layered on only the observer side or the opposite one side of the transparent light scattering body or the laminate thereof or may be layered on both sides. Especially when use is made as the reflective screen, the reflection protection layer is preferably layered on the observer side. The reflection protection layer is preferably formed by using a resin or metal which does not compromise the transmission visibility or a desired optical property of the transparent light scattering body or the laminate thereof. For such a resin, for example, a resin curable by ultraviolet light/electron beams, i.e., an ionizing radiation-curable resin, those obtained by adding a thermoplastic resin and a solvent to an ionizing radiation-curable resin, and a heat setting resin can be used. Among these, an ionizing radiation-curable resin is particularly preferred.

A method of forming the reflection protection layer is not particularly limited, and a dry coating method such as pasting of a coating film, or direct deposition or sputtering on a film substrate; and a wet coating treatment method such as gravure coating, microgravure coating, bar coating, slide die coating, slot die coating, and dip coating can be used.

<Method for Manufacturing Transparent Light Scattering Body>

A method for manufacturing the transparent light scattering body according to the present invention comprises the step of forming the transparent light scattering body. In the step of forming the transparent light scattering body, molding process can be performed by means of known methods such as an extrusion molding method involving kneading and filming steps, a cast film method, coating methods such as spin coating, die coating, dip coating, bar coating, flow coating, roll coating, gravure coating, spray coating, and the like, an injection molding method, a calendar molding method, a blow molding method, a compression molding method, and a cell casting method, and in view of the wide range of the formable film thickness, preferably, an extrusion molding method and an injection molding method can be used. Each step for the extrusion molding method will be described in details below.

(Kneading Process)

The kneading process is a process in which the resin as the above-described transparent binder and the metallic microparticles are kneaded to obtain a resin composition. The kneading extruder may be a single- or a twin-screw kneading extruder. Preferably in the step, when the twin-screw kneading extruder is used, the above-described resin and the microparticles are kneaded while applying a shear stress preferably from 3 to 1,800 kPa, more preferably from 6 to 1,400 kPa on average over the whole length of the screw of the twin-screw kneading extruder to obtain a resin composition. When the shear stress is in the above-described ranges, the microparticles can be sufficiently dispersed in the resin. In particular, when the shear stress is 3 kPa or higher, the dispersion homogeneity of the microparticles can be more improved, and when the shear stress is 1,800 kPa or lower, the resin is prevented from degradation, thereby preventing contamination of air bubbles in the transparent light scattering body. The shear stress can be set within a desired range by regulating the twin-screw kneading extruder. In the present invention, the resin composition may be obtained by kneading a mixture of a resin (masterbatch) to which microparticles are added beforehand and a resin with no microparticles added by means of a single- or a twin-screw kneading extruder. The above description is one example of the kneading step, and a masterbatch may be made by using a single screw kneading extruder, or by adding a commonly known dispersing agent.

Other than the above-described resins and the microparticles, conventionally known additives may be added to the resin composition to the extent the transmission visibility and the desired optical performance of the transparent light scattering body are not compromised. Examples of the additive include an antioxidant, a glidant, a UV absorber, a compatibilizer, a nucleating agent, a stabilizer, and the like. The resins and the microparticles are in accordance with the descriptions as above.

A twin-screw kneading extruder used in the kneading process comprises a cylinder and two screws therein and is configured by combining screw elements. For the screw, a flight screw at least including a conveying element and a mixing and kneading element can be suitably used. The mixing and kneading element preferably includes at least one selected from the group consisting of a kneading element, a mixing element, and a rotary element. By using such a flight screw including a mixing and kneading element, the microparticles can be sufficiently dispersed in the resin while applying a desired shear stress.

(Film Manufacturing Process)

A film manufacturing process is a process in which the resin composition obtained in the kneading process is formed into a film. The film manufacturing method is not particularly limited, and a conventionally known method can be used to form the transparent light scattering body made of the resin composition. For example, the resin composition obtained in the kneading process is provided to a melt extruder heated to a temperature (Tm to Tm+70° C.) higher than the melting point to melt the resin composition. For the melt extruder, a single-screw kneading extruder, a twin-screw kneading extruder, a vent extruder, a tandem extruder, or the like can be used depending on the purposes.

Subsequently, the molten resin composition is, for example, extruded into a sheet form by a die, for example, a T-die, and the extruded sheet is quenched and solidified by a revolving cooling drum or the like, thereby forming a sheet form molded body. When the film manufacturing process is performed in continuation with the above-described kneading process, the resin composition obtained in the kneading process in a molten state can be directly extruded from a die to cast the sheet form transparent light scattering body.

The sheet form transparent light scattering body obtained in the film manufacturing process can be further uniaxially stretched or biaxially stretched by a conventionally known method. By stretching the above-described transparent light scattering body, the mechanical strength can be improved.

<Reflective Transparent Screen>

The reflective transparent screen according to the present invention comprises the above-described transparent light scattering body. The reflective transparent screen may be consisted of only the above-described transparent light scattering body or may further comprise a support such as a transparent partition. The reflective transparent screen may be of a planar or a curved surface, or may have a concave-convex surface.

(Support)

The support is for supporting the transparent light scattering body. The support may be those which does not compromise the transmission visibility and the desired optical performance of the reflective transparent screen, and the examples thereof include a transparent partition, a glass window, a head-up display for a vehicle, a wearable display, and the like.

Such reflective transparent screen has a diffuse reflectance light brilliance profile satisfying the following condition A, measured with a goniophotometer. By satisfying condition A, a clear video image is displayed when light was introduced in a 45 degrees angle against the parallel direction of the screen surface, since the brilliance of diffused and reflected light at the angle of 90 degrees is within the suitable range.

Condition A: relative brilliance of diffuse reflectance light at 90 degrees is 0.001 or more, preferably 0.002 to 1, and more preferably 0.004 to 0.5, when light was introduced in a 45 degrees angle against the parallel direction of the screen surface and when brilliance in the specular reflection direction of 135 degrees was determined as 100.

<Member for Vehicle>

A member for a vehicle according to the present invention comprises the transparent light scattering body or the reflective transparent screen as described above and may further comprise a reflection protection layer and the like. Examples of the member for a vehicle include a windshield, a side glass, and the like. When the member for a vehicle comprises the transparent light scattering body or the reflective transparent screen described above, a clear image can be displayed on the member for a vehicle without having to provide a separate screen.

<Member for Building>

A member for a building according to the present invention comprises the transparent light scattering body or the reflective transparent screen described above and may further comprise a reflection protection layer and the like. Examples of the member for a building include a window glass for a building, a glass wall for a convenient store, a shop along the street, and the like. When the member for a building comprises the transparent light scattering body or the reflective transparent screen described above, a clear image can be displayed on the member for a building without having to provide a separate screen.

<Video Image Projection System>

A video image projection system according to the present invention comprises the transparent light scattering body or the reflective transparent screen described above and a video image projector. The video image projector is not particularly limited, as long as it is capable of projecting a video image on the screen, and for example, a commercially available front projector can be used.

Figure 2:
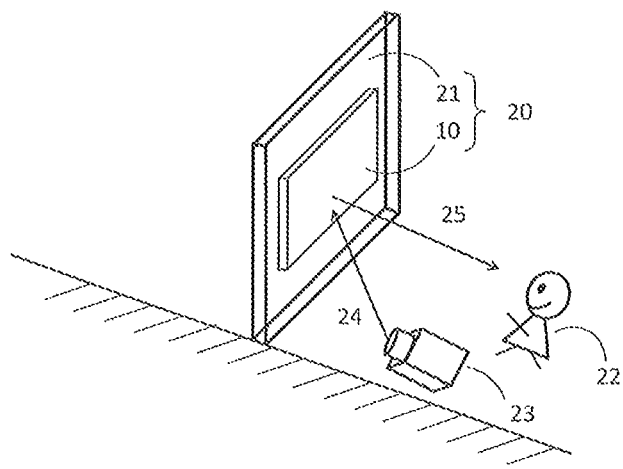
FIG. 2 is a schematic view showing one embodiment of the transparent light scattering body and the image projection system according to the present invention.
Figure 3:
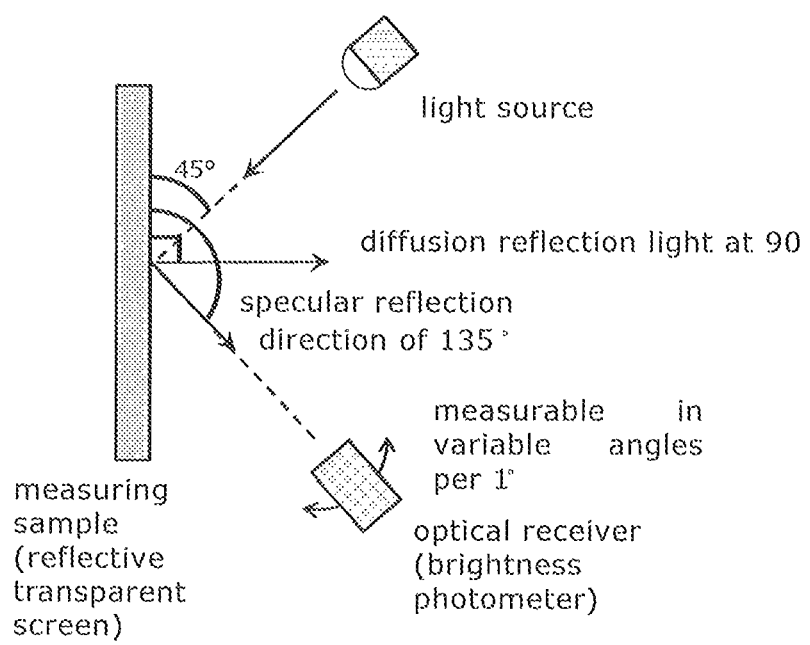
FIG. 3 is a diagrammic illustration of the measuring conditions of the relative brilliance of diffuse reflectance light.

A schematic diagram illustrating one embodiment of the reflective transparent screen and the video image projection system according to the present invention is shown in FIG. 2. A reflective transparent screen 20 comprises a transparent partition (support) 21 and a transparent light scattering body 10 arranged at the observer 22 side above the transparent partition 21. The transparent light scattering body 10 may comprise an adhesive layer to attach to the transparent partition 21. The video image projection system comprises the reflective transparent screen 20 and a video image projector 23 arranged at the same side as the observer 22 (front side) against the reflective transparent screen 20. Projection light 24 emitted from the projector 23 enters from the front side of the transparent screen 20, diffuses anisotropically by the transparent light scattering body 10 so that the observer 22 recognizes scattered light 25.

EXAMPLES

In the following, the present invention will be more specifically described with making reference to Examples and Comparative Examples; however, the present invention should not be construed to be limited to the following Examples.

<Measuring Method>

The measuring methods of various physicalities and performance evaluation in the Examples and the Comparative Examples are as follows.

(1) Average Particle Size of the Secondary Particles

Average particle size of the secondary particles of the metallic particles in the transparent light scattering body was measured by calculating the average value when particle size=(particle size in the long axis direction+particle size in the short axis direction)/2, based on the image obtained by using a scanning electron microscope (SEM) (manufactured by Hitachi High-Technologies Corporation, product name: SU-1500).

(2) Haze

Haze value of the transparent light scattering body was measured by using a turbidimeter (Part No.: NDH-5000; manufactured by NIPPON DENSHOKU INDUSTRIES CO., LTD.) in accordance with JIS K 7136.

(3) Total Light Transmittance

Total light transmittance of the transparent light scattering body was measured by using a turbidimeter (Part No.: NDH-5000; manufactured by NIPPON DENSHOKU INDUSTRIES CO., LTD.) in accordance with JIS K 7136-1.

(4) Color

Color was evaluated by measuring the value of a* and b* when reflection light in the 0 degree direction was expressed in CIE 1976 color space (L*, a*, b*) when entry angle was 45 degrees, by using a goniophotometer (manufactured by NIPPON DENSHOKU INDUSTRIES CO., LTD., part number: GC5000L, light source D65).

(5) Image Clarity

Image clarity is a value of definition (%) when measured with an optical comb width of 0.125 mm by using an image clarity measuring device (Part No.: ICM-IT; manufactured by Suga Test Instruments Co., Ltd.) in accordance with JIS K7374. The larger the value of the definition, the higher is the transmitted image clarity, and the image transmitted through the transparent screen is clear.

(6) Relative Brilliance of Diffuse Reflectance Light

By using a goniophotometer (product no: GSP-2; manufactured by Murakami Color Research Laboratory), relative brilliance of diffuse reflectance light was measured by introducing light in an angle of 45 degrees against the parallel direction of the reflective transparent screen, and the relative brilliance of diffuse reflectance light in 90 degrees was calculated when the brilliance in the specular reflection direction of 135 degrees was determined as 100.

(7) Evaluation of Simultaneous Visibility of Background Image and Projected Image An image was projected from a 50 cm away position in an angle of 45 degrees down from the normal direction of the transparent screen using an ultra short focus projector (model number: EB-535W, manufactured by Seiko Epson Corporation). Then, after adjusting the focusing knob of the projector so that the image is focused on the screen face, the visibilities of the projected video image on the screen and the background image transmitted through the screen to be seen were evaluated simultaneuously by the following evaluation criteria, at a position 1 m away from the front of the screen (the same side as the projector with the screen in between).

[Evaluation Criteria]

⊚: able to simultaneously visualize an extremely clear back ground image and an extremely clear projected image ○: able to simultaneously visualize a clear back ground image and a clear projected image
Δ: able to simultaneously visualize back ground image and projected image but with less clarity than the screen evaluated with ○, usable as reflective transparent screen
×: background image or projected image was unclear, unsuitable as reflective transparent screen
<Manufacturing of Film for Transparent Screen>

Example 1

A polyethylene terephthalate (PET) pellet (manufactured by Bell Polyester Products, Inc., brand name: IFG8L) and 0.004% by mass of aluminum microparticles A (aluminum nanopowder manufactured by Japan Ion Co.) based on the PET pellet were mixed for 30 minutes in a tumbler mixer to obtain a PET pellet which aluminum microparticles A were attached to its surface homogeneously. The obtained pellet was supplied to a hopper of a twin-screw kneading extruder with a strand die and a PET pellet in which aluminum microparticles A are kneaded in was obtained at an extrusion temperature of 250° C. The obtained aluminum microparticles A-containing PET pellet were introduced into a hopper of a single-screw extruder with a T die, extruded at extrusion temperature of 250° C. to produce a film in a thickness of 100 μm, and thus a transparent light scattering body is obtained.

The average particle size of the secondary particles of the aluminum microparticles A in the obtained transparent light scattering body was measured as 100 nm. The haze value of the transparent light scattering body was 2.7%, the total light transmittance was 89.1%, and the color indice of a* was 0.12 and b* was 3.15, resulting in a high transparency. Also, the image clarity was 93%, and the screen seen through the transparent light scattering body was clear.

Further, when the transparent light scattering body was directly used as the transparent screen, the relative brilliance of the diffuse reflectance light was measured as 0.118 with a goniophotometer, and when a video image was projected with an ultra short focus projector, it was possible to visualize an extremely clear background image and an extremely clear projection image simultaneously.

Example 2

A transparent light scattering body was prepared in a similar manner as Example 1, except that 0.015% by mass of aluminum microparticles B (aluminum powder made by Yamato Metal Powder Co., Ltd.) based on the PET pellet were added instead of aluminum microparticles A.

The average particle size of the secondary particles of the aluminum microparticles B in the obtained transparent light scattering body was measured as 1800 nm. The haze value of the transparent light scattering body was 13.7%, the total light transmittance was 76.1%, and the color indice of a* was 0.15 and b* was 2.72, resulting in a high transparency. Also, the image clarity was 85%, and the image seen through the transparent light scattering body was clear.

Further, when the transparent light scattering body was directly used as the transparent screen, the relative brilliance of the diffuse reflectance light was measured as 0.025 with a goniophotometer, and when a video image was projected with an ultra short focus projector, it was possible to visualize an extremely clear background image and an extremely clear projection image simultaneously.

Example 3

A transparent light scattering body was prepared in a similar manner as Example 1, except that 0.01% by mass of silver microparticles (aluminum powder made by Shinkou Kagaku K.K.) based on the PET pellet were added instead of aluminum microparticles A.

The average particle size of the secondary particles of the silver microparticles in the obtained transparent light scattering body was measured as 500 nm. The haze value of the transparent light scattering body was 4.1%, the total light transmittance was 83.6%, and the color indice of a* was −0.06 and b* was 3.43, resulting in a high transparency. Also, the image clarity was 87%, and the image seen through the transparent light scattering body was clear.

Further, when the transparent light scattering body was directly used as the transparent screen, the relative brilliance of the diffuse reflectance light was measured as 0.007 with a goniophotometer, and when a video image was projected with an ultra short focus projector, it was possible to visualize an extremely clear background image and an extremely clear projection image simultaneously.

Example 4

By using a sputtering device (model number: MLH-2304, ULVAC, Inc.), a nickel thin film in a thickness of 500 nm was prepared by DC magnetron sputtering method, and the obtained nickel thin film was grounded by means of a grinding machine (model number: SJ-100C, manufactured by Nisshin Engineering Inc.) to obtain powdery nickel microparticles A.

A transparent light scattering body was prepared in a similar manner as Example 1, except that 0.0005% by mass of the above-described nickel microparticles A based on the PET pellet were added instead of aluminum microparticles A.

The average particle size of the secondary particles of the nickel microparticles A in the obtained transparent light scattering body was measured as 1000 nm. The haze value of the transparent light scattering body was 6.5%, the total light transmittance was 80.2%, and the color indice of a* was 0.49 and b* was 1.90, resulting in a high transparency. Also, the image clarity was 92%, and the image seen through the transparent light scattering body was clear.

Further, when the transparent light scattering body was directly used as the transparent screen, the relative brilliance of the diffuse reflectance light was measured as 0.005 with a goniophotometer, and when a video image was projected with an ultra short focus projector, it was possible to visualize a background image and a projection image simultaneously, however with less clarity.

Example 5

A transparent light scattering body was prepared in a similar manner as Example 1, except that 0.004% by mass of aluminum microparticles C (aluminum powder manufactured by Yamato Metal Powder Co., Ltd.) based on the PET pellet were added instead of aluminum microparticles A.

The average particle size of the secondary particles of the aluminum microparticles C in the obtained transparent light scattering body was measured as 1200 nm. The haze value of the transparent light scattering body was 3.7%, the total light transmittance was 86.1%, and the color indice of a* was 0.17 and b* was 1.38, resulting in a high transparency. Also, the image clarity was 91%, and the image seen through the transparent light scattering body was clear.

Further, when the transparent light scattering body was directly used as the transparent screen, the relative brilliance of the diffuse reflectance light was measured as 0.007 with a goniophotometer, and when a video image was projected with an ultra short focus projector, it was possible to visualize a clear background image and a clear projection image simultaneously.

Example 6

In a similar manner as Example 4, a nickel thin film in a thickness of 300 nm was prepared by using a sputtering device, and the obtained nickel thin film was grounded with a grinding machine to obtain a powdery nickel microparticles B.

A transparent light scattering body was prepared in a similar manner as Example 1, except that 0.02% by mass of the above-described nickel microparticles B based on the PET pellet were added instead of aluminum microparticles A.

The average particle size of the secondary particles of the nickel microparticles B in the obtained transparent light scattering body was measured as 200 nm. The haze value of the transparent light scattering body was 9.2%, the total light transmittance was 71.6%, and the color indice of a* was 0.62 and b* was 2.35, resulting in a high transparency. Also, the image clarity was 93%, and the image seen through the transparent light scattering body was clear.

Further, when the transparent light scattering body was directly used as the transparent screen, the relative brilliance of the diffuse reflectance light was measured as 0.002 with a goniophotometer, and when a video image was projected with an ultra short focus projector, it was possible to visualize a clear background image and a clear projection image simultaneously.

Example 7

A transparent light scattering body was prepared in a similar manner as Example 1, except that 0.001% by mass of platinum mlcroparticles (9410 DX, manufactured by Corefront Corporation) based on the PET pellet were added instead of aluminum microparticles A.

The average particle size of the secondary particles of the platinum microparticles in the obtained transparent light scattering body was measured as 300 nm. The haze value of the transparent light scattering body was 5.4%, the total light transmittance was 88.3%, and the color indice of a* was 0.33 and b* was 2.42, resulting in a high transparency. Also, the image clarity was 89%, and the image seen through the transparent light scattering body was clear.

Further, when the transparent light scattering body was directly used as the transparent screen, the relative brilliance of the diffuse reflectance light was measured as 0.009 with a goniophotometer, and when a video image was projected with an ultra short focus projector, it was possible to visualize a clear background image and a clear projection image simultaneously.

Comparative Example 1

A transparent light scattering body was prepared in a similar manner as Example 1, except that 0.004% by mass of aluminum microparticles D (aluminum powder manufactured by Japan Ion Co.) based on the PET pellet were added instead of aluminum microparticles A.

The average particle size of the secondary particles of the aluminum microparticles D in the obtained transparent light scattering body was measured as 3000 nm. The haze value of the transparent light scattering body was 7.7%, the total light transmittance was 82.5%, and the color indice of a* was 0.23 and b* was 1.18. The image clarity was 82%.

Further, when the transparent light scattering body was directly used as the transparent screen, the relative brilliance of the diffuse reflectance light was measured as 0.0002 with a goniophotometer, and when a video image was projected with an ultra short focus projector, it was not possible to visualize a clear background image and a clear projection image simultaneously.

Comparative Example 2

A transparent light scattering body was prepared in a similar manner as Example 1, except that 0.10% by mass of titanium oxide microparticles (product name: CR•EL, manufactured by Ishihara Sangyo Kaisha, Ltd.) based on the PET pellet were added instead of aluminum microparticles A.

The average particle size of the secondary particles of the titanium oxide microparticles in the obtained transparent light scattering body was measured as 500 nm. The haze value of the transparent light scattering body was 7.3%, the total light transmittance was 82.8%, and the color indice of a* was −1.66 and b* was −12.90. The image clarity was 83%, and although the image seen through the transparent light scattering body was clear, the color was bluish overall and the color reproducibility was poor.

Further, when the transparent light scattering body was directly used as the transparent screen, the relative brilliance of the diffuse reflectance light was measured as 0.010 with a goniophotometer, and when a video image was projected with an ultra short focus projector, it was not possible to visualize a clear background image and a clear projection image simultaneously.

Comparative Example 3

By using a sputtering device, a copper thin film in a thickness of 30 nm was manufactured by DC magnetron sputtering method, and the obtained copper thin film was grounded with a grinding machine to obtain copper microparticles.

A transparent light scattering body was prepared in a similar manner as Example 1, except that 0.05% by mass of the above-described copper microparticles based on the PET pellet were added instead of aluminum microparticles A.

The average particle size of the secondary particles of the copper microparticles in the obtained transparent light scattering body was measured as 80 nm. The haze value of the transparent light scattering body was 32.2%, the total light transmittance was 45.0%, the color indice of a* was 13.87 and b* was 17.50, resulting in a transparent light scattering body without transparency and having poor color reproducibility. The image clarity was 58%, and the image seen through the transparent light scattering body was clear.

Further, when the transparent light scattering body was directly used as the transparent screen, the relative brilliance of the diffuse reflectance light was measured as 0.14 with a goniophotometer, and a clear image was able to be visualized; however, when a video image was projected with an ultra short focus projector, it was not possible to visualize a clear background image and a clear projection image simultaneously.

Comparative Example 4

By using a sputtering device, a gold thin film in a thickness of about 1000 μm was manufactured by DC magnetron sputtering method, and the obtained gold thin film was grounded with a grinding machine to obtain glod microparticles.

A transparent light scattering body was prepared in a similar manner as Example 1, except that 0.0001% by mass of the above-described gold microparticles based on the PET pellet were added instead of aluminum microparticles A.

The average particle size of the secondary particles of the gold microparticles in the obtained transparent light scattering body was measured as 3000 nm. The haze value of the transparent light scattering body was 0.4%, the total light transmittance was 89.2%, and the color indice of a* was −1.25 and b* was −8.27, resulting in a transparent light scattering body having transparency but poor color reproducibility. The image clarity was 92%, and the image seen through the transparent light scattering body was clear.

Further, when the transparent light scattering body was directly used as the transparent screen, the relative brilliance of the diffuse reflectance light was measured as 0.0001 with a goniophotometer, and when a video image was projected with an ultra short focus projector, it was not possible to visualize a clear background image and a clear projection image simultaneously.

The details and evaluation results of the transparent light scattering body used in the Examples and Comparative Examples are shown in Table 3.

measured wavelength of 450 nm and the regular reflectance R in the measured wavelength of 650 nm is within 25% of the regular reflectance R in the measured wavelength of 550 nm, and the metallic microparticles consist of secondary particles in the transparent light scattering body, and the average particle size of the secondary particles is from 100 nm to 2000 nm, the content of the metallic microparticles is from 0.0001 to 0.004% by mass based on the transparent binder, wherein the secondary particle size is the size of the sum of the length of the secondary particle in a long axis direction and the length of the secondary particle in a short axis direction divided by two.

2. The transparent light scattering body according to claim 1, wherein
the real number term of the electric permittivity of the metallic microparticles at a wavelength of 550 nm is from −60 to 0.

3. The transparent light scattering body according to claim 1, wherein
the metallic material is at least one selected from the group consisting of aluminum, silver, platinum, titanium, nickel, and chromium.

4. The transparent light scattering body according to claim 1, wherein

TABLE 3

| | Metallic Materials | Average particle size of secondary particles [nm] | Concentration [wt %] | Haze [%] | Total light transmittance [%] | Color a* | Color b* | Image Clarity [%] | Relative Brilliance | Screen Performance |
|---|---|---|---|---|---|---|---|---|---|---|
| Example 1 | Al | 100 | 0.004 | 2.7 | 89.1 | 0.12 | 3.15 | 93 | 0.118 | ⊚ |
| Example 2 | Al | 1800 | 0.015 | 13.7 | 76.1 | 0.15 | 2.72 | 85 | 0.025 | ○ |
| Example 3 | Ag | 500 | 0.01 | 4.1 | 83.6 | −0.06 | 3.43 | 87 | 0.007 | ⊚ |
| Example 4 | Ni | 1000 | 0.0005 | 6.5 | 80.2 | 0.49 | 1.90 | 92 | 0.005 | Δ |
| Example 5 | Al | 1200 | 0.004 | 3.7 | 86.1 | 0.17 | 1.38 | 91 | 0.007 | ○ |
| Example 6 | Ni | 200 | 0.02 | 9.2 | 71.6 | 0.62 | 2.35 | 93 | 0.002 | ○ |
| Example 7 | Pt | 300 | 0.001 | 5.4 | 88.3 | 0.33 | 2.42 | 89 | 0.009 | ○ |
| Comparative Example 1 | Al | 3000 | 0.004 | 7.7 | 82.5 | 0.23 | 1.18 | 82 | 0.0002 | X |
| Comparative Example 2 | TiO₂ | 500 | 0.10 | 7.3 | 82.8 | −1.66 | −12.90 | 83 | 0.010 | X |
| Comparative Example 3 | Cu | 80 | 0.05 | 32.2 | 45.0 | 13.87 | 17.50 | 58 | 0.14 | X |
| Comparative Example 4 | Au | 3000 | 0.0001 | 0.4 | 89.2 | −1.25 | −8.27 | 92 | 0.0001 | X |

DESCRIPTION OF SYMBOLS

10 Transparent light scattering body
11 Transparent binder
12 Metallic microparticles
20 Reflective transparent screen
21 Transparent partition (Support)
22 Observer
23 Image projector
24 Projected light
25 Scattered light

The invention claimed is:

1. A transparent light scattering body comprising a transparent binder and metallic microparticles, wherein
the regular reflectance R of the metallic material of the metallic microparticles is 50% or more in the measured wavelength of 550 nm, and the absolute value of the difference between the regular reflectance R in the the haze value of the transparent light scattering body is 35% or less.

5. The transparent light scattering body according to claim 1, wherein
the total light transmittance of the transparent light scattering body is 70% or more.

6. The transparent light scattering body according to claim 1, wherein
the image clarity of the transparent light scattering body is 70% or more.

7. A reflective transparent screen comprising the transparent light scattering body according to claim 1.

8. The reflective transparent screen according to claim 7, wherein the relative brilliance of diffuse reflectance light satisfies the following condition A:
Condition A: the relative brilliance of diffuse reflectance light at 90 degrees is 0.001 or more, when light was introduced in a 45 degrees angle against the parallel direction of the screen surface of the reflective transparent screen and when brilliance in the specular reflection direction of 135 degrees was determined as 100.

9. A member for a vehicle comprising the transparent light scattering body according to claim 1.

10. A member for a building comprising the transparent light scattering body according to claim 1.

11. An image projection system comprising the transparent light scattering body according to claim 1.

12. A member for a vehicle comprising the reflective transparent screen according to claim 7.

13. A member for a building comprising the reflective transparent screen according to claim 7.

14. An image projection system comprising the reflective transparent screen according to claim 7.

15. The reflective transparent screen according to claim 7, further comprising a support for supporting the transparent light scattering body.

16. The member for a vehicle according to claim 9, further comprising a support for supporting the transparent light scattering body.

17. The member for a building component according to claim 10, further comprising a support for supporting the transparent light scattering body.

18. The image projection system according to claim 11, further comprising a support for supporting the transparent light scattering body.

19. The member for a vehicle according to claim 12, further comprising a support for supporting the reflective transparent screen.

20. The member for a building component according to claim 13, further comprising a support for supporting the reflective transparent screen.

21. The image projection system according to claim 14, further comprising a support for supporting the reflective transparent screen.

\* \* \* \* \*